(12) United States Patent
Wang (10) Patent No.: US 10,299,323 B2
(45) Date of Patent: May 21, 2019

(54) LIGHT-EMITTING DIODE FLASHER BULB

(71) Applicant: ROUNDTRIPPING LTD., Taipei (TW)

(72) Inventor: Dennis Wang, Wanchai (HK)

(73) Assignee: ROUNDTRIPPING LTD., Taipei (TW)

( * ) Notice: Subject to any disclaimer, the term of this patent is extended or adjusted under 35 U.S.C. 154(b) by 9 days.

(21) Appl. No.: 15/630,858

(22) Filed: Jun. 22, 2017

(65) Prior Publication Data

US 2018/0376551 A1 Dec. 27, 2018

(51) Int. Cl.
*H05B 37/02* (2006.01)
*H05B 33/08* (2006.01)

(52) U.S. Cl.
CPC ..... *H05B 33/0815* (2013.01); *H05B 37/0281* (2013.01); *H05B 33/0827* (2013.01); *H05B 33/0842* (2013.01)

(58) Field of Classification Search
CPC ............ H05B 33/0806; H05B 33/0809; H05B 33/0815; H05B 33/0827; H05B 33/083; H05B 33/0842; H05B 37/02; H05B 39/09
See application file for complete search history.

(56) References Cited

U.S. PATENT DOCUMENTS

| | | | | |
|---|---|---|---|---|
| 2010/0237788 A1* | 9/2010 | Tsai | .................... | H05B 33/0803 315/187 |
| 2011/0148311 A1* | 6/2011 | Neuman | ............ | H05B 33/0842 315/185 R |
| 2013/0119874 A1* | 5/2013 | Zhang | .................... | H05B 37/02 315/186 |
| 2016/0105937 A1* | 4/2016 | Altamura | ........... | H05B 33/0842 315/186 |

* cited by examiner

*Primary Examiner* — Thien M Le
*Assistant Examiner* — April A Taylor
(74) *Attorney, Agent, or Firm* — Seed IP Law Group LLP (57) ABSTRACT

Various embodiments provide a light emitting diode (LED) flasher bulb that provides a flashing function for LED string lights. The LED flasher bulb is inserted into any one of a plurality of connectors of the LED string lights, and is compatible with an alternating current power source. The LED flasher bulb alternates the LED string lights between an on state in which LEDs of the LED string lights are lit up, and an off state in which the LEDs are not lit up. The LED flasher bulb is able to continuously alternate the LED string lights between the on state and the off state according to a determined pattern independent of the AC signal generated by the AC power source being positive or negative.

18 Claims, 5 Drawing Sheets

FIG. 6

LIGHT-EMITTING DIODE FLASHER BULB

BACKGROUND

Technical Field

The present disclosure is directed to a light-emitting diode (LED) flasher bulb for LED string lights.

Description of the Related Art

String lights are a plurality of light bulbs, typically 20 to 500 light bulbs, wired together. Traditionally, the light bulbs are wired together in series and are powered by an alternating current (AC) power supply. String lights are often used as decoration for various occasions, such as holidays (e.g., Christmas), festivals, and weddings. String lights typically use either traditional incandescent light bulbs or light emitting diode (LED) light bulbs. LED light bulbs have become increasingly popular as LED light bulbs are more energy efficient than incandescent light bulbs and generally have a longer lifetime.

Most string lights have a flashing function in which the light bulbs alternate between being turned on (i.e., lit up) and turned off (i.e., not lit up). In order to provide the flashing function for LED string lights, current LED string lights utilize an external device, such as an external control circuit board, to control whether the light bulbs are turned on or turned off. Having the LED string light attached to an external device can be cumbersome, especially when hanging the LED string lights from difficult places, such as a ceiling or a roof. Thus, it is desirable to have LED string lights which have a flashing function, that are not attached to an external device.

BRIEF SUMMARY

The present disclosure is directed to a light emitting diode (LED) flasher bulb for LED string lights. The LED flasher bulb alternates the LED string lights between an on state in which LEDs of the LED string lights are lit up, and an off state in which the LEDs are not lit up.

In accordance with one or more embodiments, the LED flasher bulb is able to provide a flashing function without the use of an external device, such as a control circuit board. Further, the LED flasher bulb is able to continuously alternate the LED string lights between the on state and the off state independent of whether an AC signal generated by the AC power source is positive or negative.

According to at least one embodiment, the LED string lights include connectors, LEDs, an electrical plug, and the LED flasher bulb. The connectors are wired to each other by wires and are electrically coupled to the electrical plug. In operation, the electrical plug is inserted into an electrical outlet and electrically couples the LED string lights to an alternating current (AC) power source (e.g., AC mains). Each of the connectors receives one of the LEDs or the LED flasher bulb. When the LEDs and the LED flasher bulb are inserted into the connectors, the LEDs and the LED flasher bulb are electrically coupled to each other in series.

According to at least one embodiment, the LED flasher bulb includes an LED, a body, an integrated circuit, an input terminal, and an output terminal. The body includes an LED socket, a base, and a stud. The input terminal and the output terminal contact an input wire and an output wire, respectively, when the LED flasher bulb is inserted into the connector. The LED is inserted into the LED socket. The LED socket provides electrical connections to electrically couple the LED to the LED string lights. The base of the body provides housing for the integrated circuit. The stud physically secures the LED flasher bulb to the connector.

In at least some embodiments, the integrated circuit includes a voltage regulator, a switch, a controller, and power storage. The voltage regulator is a voltage stabilizing circuit that provides a stable working power internally for the integrated circuit. The switch provides an on/off switch for the LED flasher bulb. The switch has an open state and a closed state. In the open state, the switch electrically decouples the LED from ground and creates an open circuit. Thus, as the LEDs and the LED flasher bulb are arranged in series, the LED string lights will no longer light up. In the closed state, the switch electrically couples the LED to ground and creates a closed circuit, and, thus, the LED string lights will light up. The controller is a signal circuit that generates a control signal that alternates the switch between the open state and the closed state. The power storage aids the voltage regulator to generate a steady power signal for the controller. The power storage stores the steady power signal generated by the voltage regulator when the AC signal is positive, and provides the steady power signal to the controller when the AC signal is negative. As a result, the LED flasher bulb is able to continuously function and provide the flashing function regardless of whether the AC signal generated by the AC power source is positive or negative.

DETAILED DESCRIPTION

In the following description, certain specific details are set forth in order to provide a thorough understanding of various embodiments of the disclosure. However, one skilled in the art will understand that the disclosure may be practiced without these specific details. In some instances, well-known details associated with string lights, integrated circuits, flasher bulbs, and electrical components (e.g., transistors, light-emitting diodes, capacitors, etc.) have not been described to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

Figure 1:
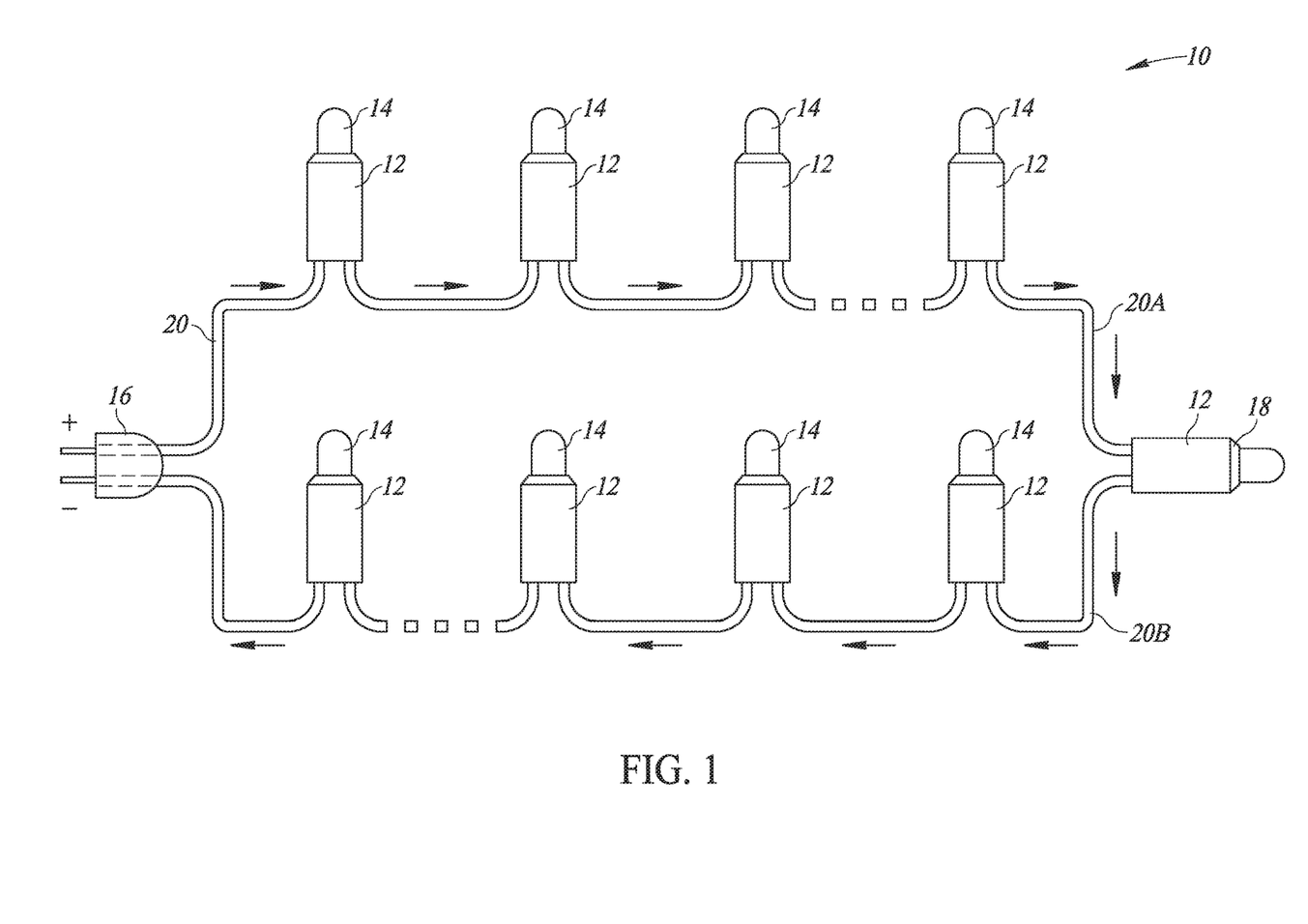
FIG. 1 shows a diagram of light-emitting diode (LED) string lights, according to one embodiment disclosed herein.
Figure 2:
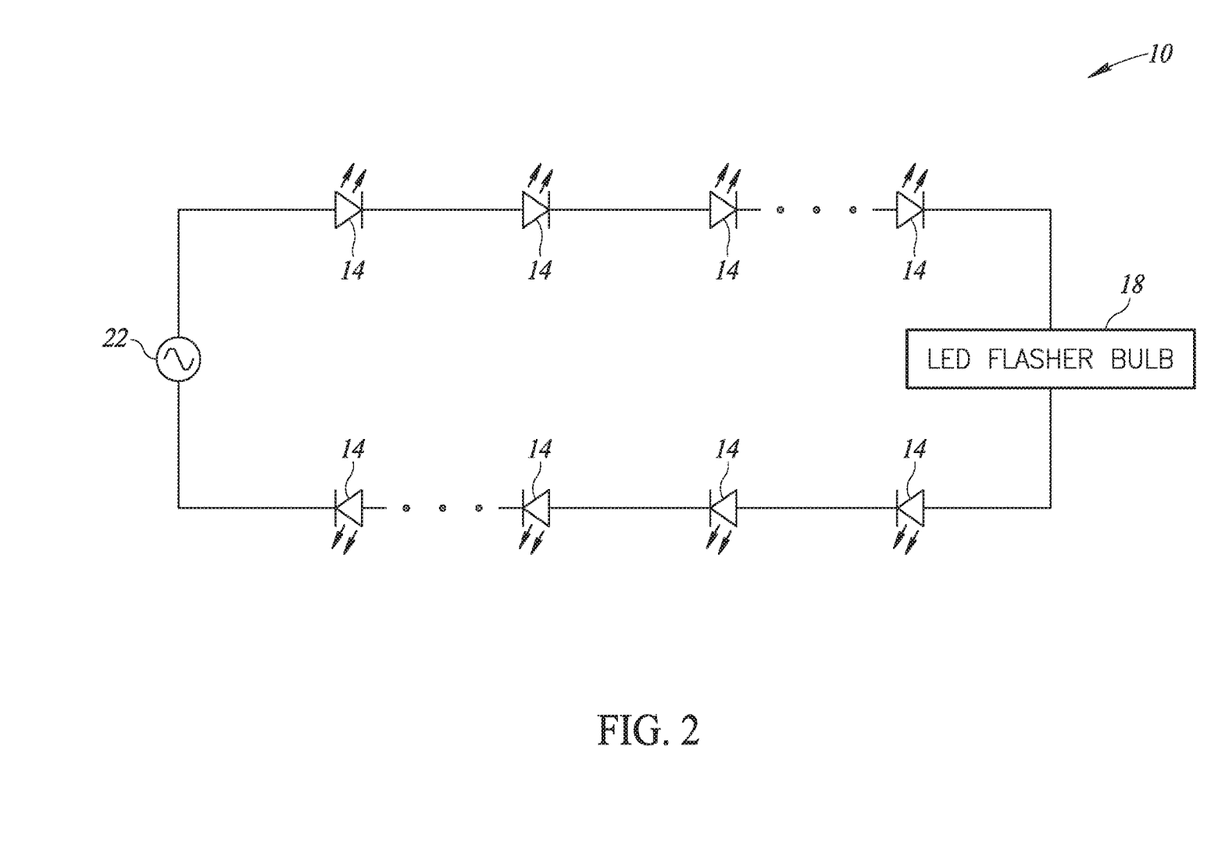
FIG. 2 shows a circuit diagram of LED string lights, according to one embodiment disclosed herein.

FIG. 1 shows a diagram of light-emitting diode (LED) string lights 10, according to one embodiment. FIG. 2 shows a circuit diagram of the LED string lights 10, according to one embodiment. It is beneficial to review FIG. 1 simultaneously with FIG. 2.

The LED string lights 10 include connectors 12, LEDs 14, an electrical plug 16, and an LED flasher bulb 18.

The connectors 12 are wired to each other by wires 20 and are electrically coupled to the electrical plug 16. In operation, the electrical plug 16 is inserted into an electrical outlet and electrically couples the LED string lights 10 to an alternating current (AC) power source 22 (FIG. 2) that generates an AC signal. In one embodiment, the AC signal has a rating of 120 volts, 60 hertz, for example.

Although the connectors 12 are shown as cylindrical tubes in FIG. 1, the connectors 12 may have a variety of shapes and sizes. For example, the connectors 12 may each be star-shaped, spherical, or shaped like a character, and the LEDs 14 and the LED flasher bulb 18 may be positioned within the connectors 12.

Each of the connectors 12 receives one of the LEDs 14 or the LED flasher bulb 18. The insertion of the LEDs 14 and the LED flasher bulb 18 will be discussed in further detail with respect to FIGS. 3 and 4. When the LEDs 14 and the LED flasher bulb 18 are inserted into the connectors 12, the LEDs 14 and the LED flasher bulb 18 are electrically coupled to each other in series. Thus, when the electrical plug 16 is electrically coupled to the AC power source 22, electricity will flow, as shown in FIG. 1, from the AC power source 22, through each of the LEDs 14 and the LED flasher bulb 18 in a clock wise direction, and return back to the AC power source 22. As a result, the LED string lights 10 will light up. Conversely, since the LEDs 14 and the LED flasher bulb 18 are arranged in series, the LED string lights 10 will no longer light up if one of the LEDs 14 or the LED flasher bulb 18 is removed or causes an open circuit. It is noted that in some LED string lights, there are multiple sets (e.g., 2, 3) of electrically parallel strings, with each string including a number (e.g., 20, 30) of LEDs electrically coupled in series together. In such instances, if one of the LEDs or the LED bulb in one of the parallel strings is removed or damaged, that one of the parallel strings will no longer light up.

Although only eight LEDs 14 are shown in FIGS. 1 and 2, the LED string lights 10 may include any number of LEDs 14. For example, the LED string lights 10 may include 20 to 500 LEDs 14, or even more. Further, the LEDs 14 may have a variety of colors, such as white, red, green, blue, yellow, etc.

The LED flasher bulb 18 provides a flashing function for the LED string lights 10. The LED flasher bulb 18 enables the LED string lights 10 to alternate between an on state in which the LEDs 14 and the LED flasher bulb 18 are lit up, and an off state in which the LEDs 14 and the LED flasher bulb 18 are not lit up. The LED flasher bulb 18 provides the flashing function by periodically creating an open circuit in the LED string lights 10. The LED flasher bulb 18 will be discussed in further detail below with respect to FIGS. 5 and 6.

As can be appreciated, as the LEDs 14 and the LED flasher bulb 18 are arranged in series, the LED flasher bulb 18 may be inserted in to any of the connectors 12 to convert the "steady on" LED string lights 10 to "flashing lights," and is not limited to the position shown in FIGS. 1 and 2.

As best shown in FIG. 2, the LED string lights 10 are a plurality of diodes that are arranged in series in a single direction, and the LED string lights 10 can be considered to be a unidirectional conducting circuit or a half-wave rectifier. Because of the unidirectional conduction characteristic of the LEDs, the LED string lights 10 will utilize the AC signal generated by the AC power source 22 when the AC signal is positive, and will block the AC signal when the AC signal is negative. Thus, the LED string lights 10 turns on when the AC signal generated by the AC power source 22 is positive, and turns off when the AC signal generated by the AC power source 22 is negative. Electricity may be conserved as the LED string lights 10 are not turned on constantly.

Figure 3:
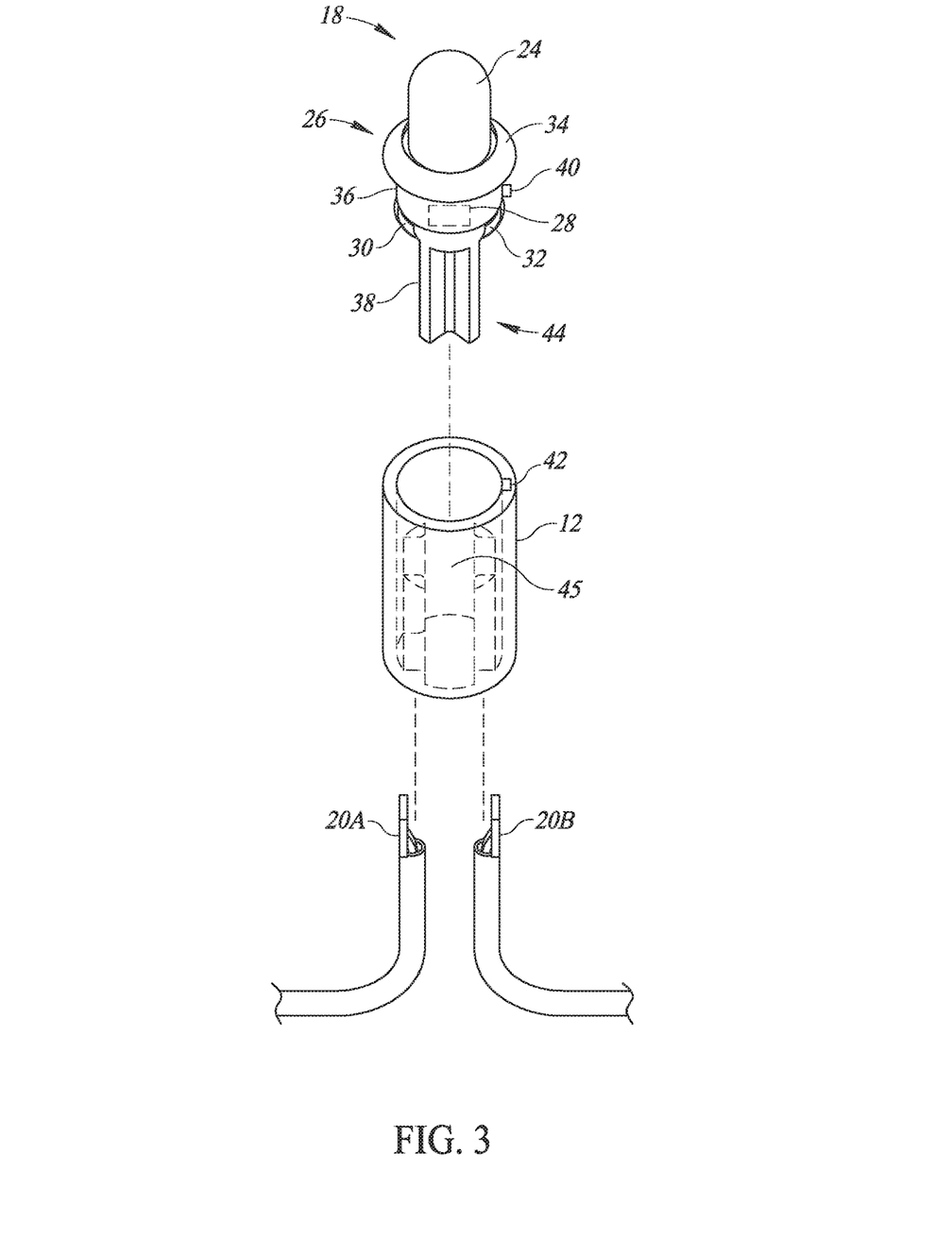
FIG. 3 shows an exploded perspective view of an LED flasher bulb and a connector of an LED string lights, according to one embodiment disclosed herein.
Figure 4:
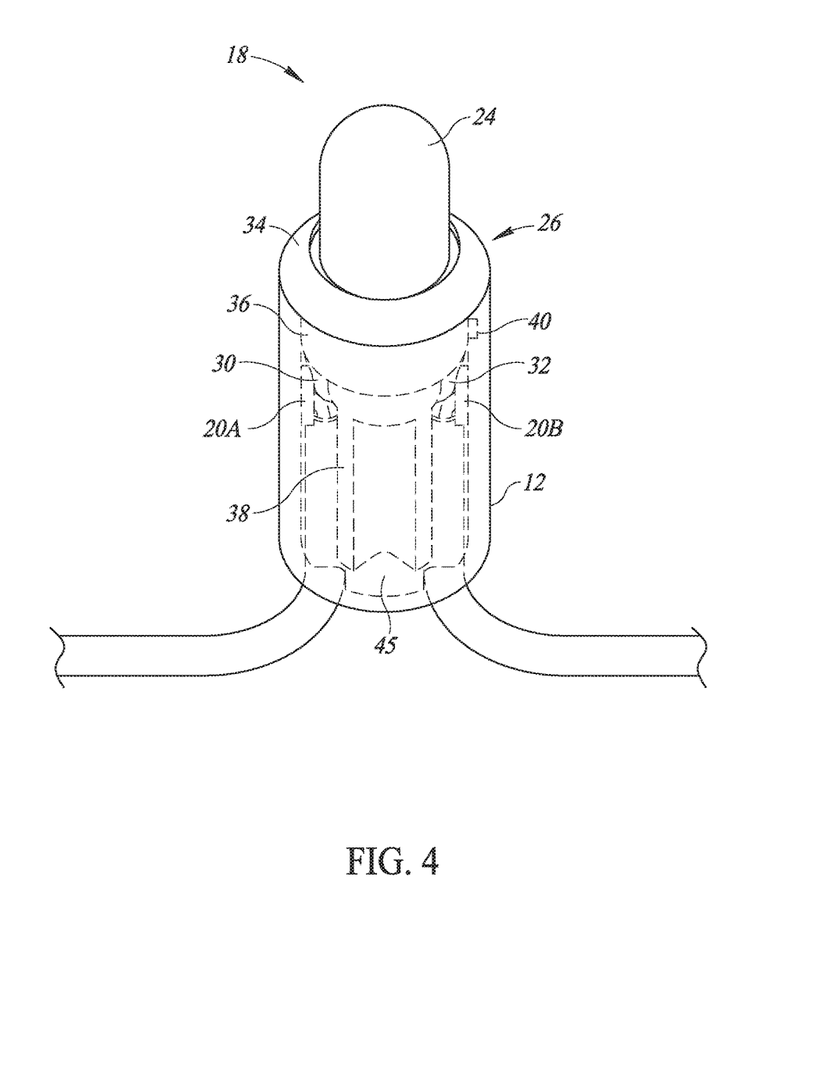
FIG. 4 shows a perspective view of an LED flasher bulb inserted into a connector of an LED string lights, according to one embodiment disclosed herein.

FIG. 3 shows an exploded perspective view of the LED flasher bulb 18 and the connector 12 of the LED string lights 10, according to one embodiment. FIG. 4 shows a side view of the LED flasher bulb 18 inserted into the connector 12 of the LED string lights 10, according to one embodiment. It is beneficial to review FIG. 3 simultaneously with FIG. 4.

As can be appreciated, although the LED flasher bulb 18 is shown in FIGS. 3 and 4, each of the LEDs 14 and the connectors 12 may have a substantially similar or identical form factor. In one embodiment, the LED flasher bulb 18 has a form factor and dimensions substantially similar to a traditional incandescent light bulb for string lights.

The LED flasher bulb 18 includes an LED 24, a body 26, an integrated circuit 28, an input terminal 30, and an output terminal 32. The body 26 includes an LED socket 34, a base 36, and a stud 38.

The LED flasher bulb 18 is installed and electrically coupled to the LED string lights 10 by inserting the LED flasher bulb 18 into the connector 12. When the LED flasher bulb 18 is inserted into the connector 12, the input terminal 30 and the output terminal 32 contact an input wire 20A and an output wire 20B, respectively. As shown in FIG. 1, the input wire 20A electrically couples the connector 12 of FIG. 3 to the previous connector in the series of connectors, and the output wire 20B electrically couples the connector 12 of FIG. 3 to the subsequent connector in the series of connectors. Thus, when the electrical plug 16 is electrically coupled to the AC power source 22, electricity will flow, as shown in FIG. 1, from the AC power source 22, through LEDs 14 preceding the LED flasher bulb 18 in the series of connectors 12, into the input terminal 30 of the LED flasher bulb 18 via the input wire 20A, out the output terminal 32 of the LED flasher bulb 18 via the output wire 20B, through LEDs 14 subsequent to the LED flasher bulb 18 in the series of connectors 12, and return back to the AC power source 22.

The LED 24 is removably or fixedly inserted into the LED socket 34 of the body 26. The LED socket 34 provides electrical connections to electrically couple the LED 24 to the LED string lights 10. In particular, as will be discussed in further detail with respect to FIGS. 5 and 6, the LED socket 34 electrically couples the LED 24 to the input terminal 30 and the integrated circuit 28. The LED 24 may be any type of LED now known or later developed.

The base 36 of the body 26 provides a housing for the integrated circuit 28. That is, the integrated circuit 28 is positioned within the base 36 and protected from an external environment. As will be discussed in further detail with respect to FIGS. 5 and 6, the integrated circuit 28 provides the flashing function of the LED flasher bulb 18. The base 36 includes a guide 40 that protrudes from a surface of the base 36, and the connector 12 includes a slot 42 that mates with the guide 40. When the LED flasher bulb 18 is inserted in to the connector 12, the guide 40 is inserted into the slot 42. The guide 40 and the slot 42 ensure that the LED flasher bulb 18 is properly aligned when inserted into the connector 12 such that the input terminal 30 and the output terminal 32 contact the input wire 20A and the output wire 20B, respectively.

The stud 38 extends from the base 26, and is spaced from the LED socket 34 by the base 26. The stud 38 physically secures the LED flasher bulb 18 to the socket 12. In particular, the stud 38 inserts into an aperture 45 of the connector 12 that mates with the stud 30. In one embodiment, as best shown in FIG. 3, the stud 38 includes a plurality of ribs 44 that help secure the stud 38 while in the aperture 45 of the connector 12. As best shown in FIG. 4, when the LED flasher bulb 18 is properly installed into the connector 12, the base 36 and the stud 38 are completely enclosed within the connector 12, and an upper surface of the LED socket 34 is exposed to an external environment, which allows the LED 24 to be inserted in to the LED socket 34 while the LED flasher bulb is installed into the connector 12.

In one embodiment, the base 26 and the stud 38 are made of an insulating material, such as plastic. In one embodiment, the base 26 and the stud 38 are made of the same material. In one embodiment, the base 26 and the stud 38 are made of different materials.

Figure 5:
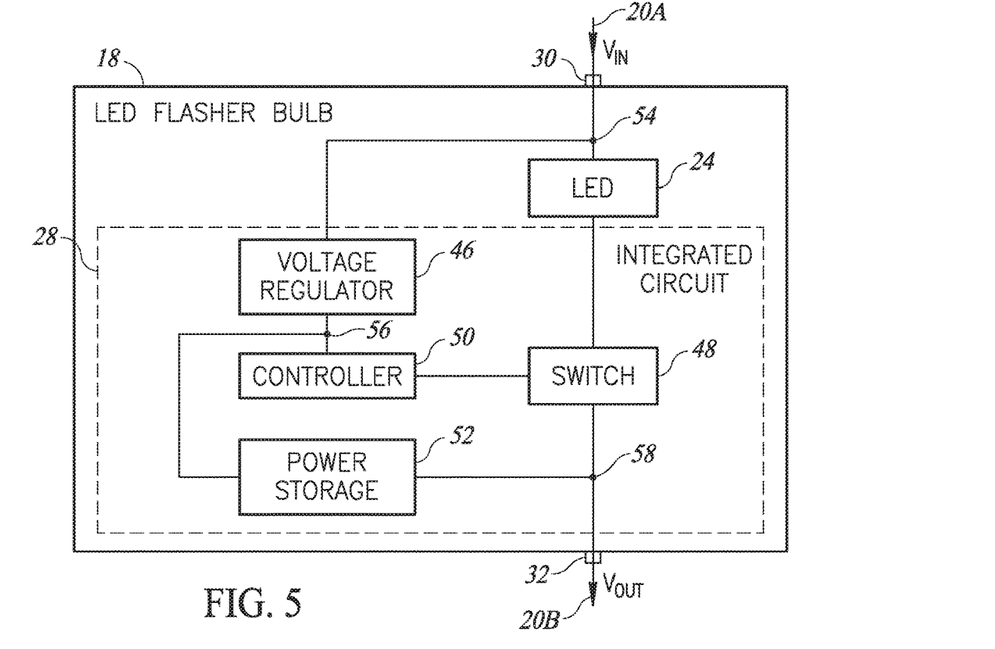
FIG. 5 shows a block diagram of an LED flasher bulb, according to one embodiment disclosed herein.
Figure 6:
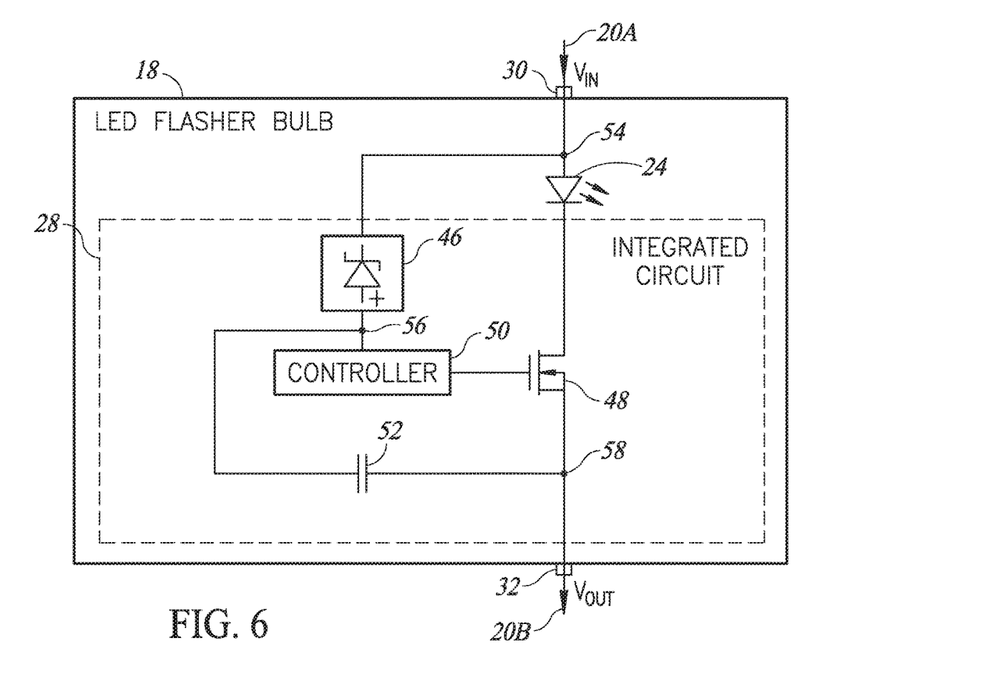
FIG. 6 shows a circuit diagram of an LED flasher bulb, according to one embodiment disclosed herein.

FIG. 5 shows a block diagram of the LED flasher bulb 18, according to one embodiment. FIG. 6 shows a circuit diagram of the LED flasher bulb 18, according to one embodiment disclosed herein. It is beneficial to review FIG. 5 simultaneously with FIG. 6.

As previously discussed, the input wire 20A and the output wire 20B are electrically coupled to the input terminal 30 and the output terminal 32, respectively. The input terminal 30 receives an input voltage $V_{IN}$ and is electrically coupled between the input wire 20A and a node 54. In one embodiment, the input terminal 30 receives the input voltage $V_{IN}$ from a previous connector in the series of connectors 12 as shown, for example, in FIG. 1. In another embodiment, the input terminal 30 receives the input voltage $V_{IN}$ directly from the AC power source 22, such as in the case when the LED flasher bulb 18 is inserted in the connector that is immediately following the electrical plug 16. The output terminal 32 outputs an output voltage $V_{OUT}$ and is electrically coupled between the output wire 20B and a node 58. In one embodiment, the output terminal 32 outputs the output voltage $V_{OUT}$ to a subsequent connector in the series of connectors 12 as shown, for example, in FIG. 1. In another embodiment, the output terminal 30 outputs the output voltage $V_{OUT}$ directly to the AC power source 22, such as in the case when the LED flasher bulb 18 is inserted in the connector that is immediately preceding the electrical plug 16.

The integrated circuit 28 includes a voltage regulator 46, a switch 48, a controller 50, and power storage 52.

The voltage regulator 46 is electrically coupled between the node 54 and a node 56. The voltage regulator 46 is a voltage stabilizing circuit that provides a stable working power internally for the integrated circuit 28. The voltage regulator 46 receives the input voltage $V_{IN}$ and generates a steady power signal for the controller 50. The voltage regulator 46 may be any type of voltage regulator now known or later developed. In one embodiment, as shown in FIG. 6, the voltage regulator 46 is a low drop output voltage-regulator tube.

As previously discussed, as best shown in FIG. 2, the LED string lights 10 are a plurality of diodes that are arranged in series in a single direction. Thus, the LED string lights 10 can be considered to be a unidirectional conducting circuit or a half-wave rectifier. As a result, the LED string lights 10 will utilize the AC signal generated by the AC power source 22 when the AC signal is positive, and will block the AC signal when the AC signal is negative. As the LED string lights 10 utilizes the AC signal when the AC signal is positive, the voltage regulator 46 generates a steady power signal for the controller 50 when the AC signal (i.e., $V_{IN}$) is positive.

The switch 48 is electrically coupled to the LED 24, the controller 50, and the node 58. The switch 48 provides an on/off switch for the LED flasher bulb 18. The switch 48 has an open state and a closed state.

In the open state, the switch 48 electrically decouples the LED 24 from the node 58 and the output terminal 32, and the LED 24 is not grounded. Accordingly, since the LEDs 14 and the LED flasher bulb 18 are arranged in series as shown in FIG. 1, the switch 48 in the open state creates an open circuit, and the LED string lights 10 will no longer light up.

In the closed state, the switch 48 electrically couples the LED 24 to the node 58 and the output terminal 32, and the LED 24 is grounded. Thus, when the electrical plug 16 is electrically coupled to the AC power source 22, electricity will flow, as shown in FIG. 1, from the AC power source 22, through LEDs 14 preceding the LED flasher bulb 18 in the series of connectors 12, into the input terminal 30 of the LED flasher bulb 18 via the input wire 20A, through the LED 24, through the switch 48, out the output terminal 32 of the LED flasher bulb 18 via the output wire 20B, through LEDs 14 subsequent to the LED flasher bulb 18 in the series of connectors 12, and return back to the AC power source 22. As a result, the LED string lights 10 will light up.

The switch 48 may be any type of switch now known or later developed. In one embodiment, as the LED flasher bulb 18 is used in conjunction with the AC power source 22 that may reach up to 300 volts, the switch 48 is a high-voltage resistance component capable of high blocking voltages. In one embodiment, as shown in FIG. 6, the switch 48 is a high voltage transistor, such as a high voltage metal oxide semiconductor field effect transistor (MOSFET). In one embodiment, the switch 48 is able to withstand at least 300 volts.

The controller 50 is electrically coupled to the node 56 and the switch 48. The controller 50 is a signal circuit that generates a control signal that controls the switch 48. The controller 50 provides a flashing function for the LED string lights 10 by generating a control signal that alternates the switch 48 between the open state and the closed state.

The controller 50 may generate a variety of different control signals to the switch 48. In one embodiment, the control signal is a square wave that alternates the switch 48 between the open state and the closed state at a predetermined frequency and/or duty cycle. In another embodiment, the control signal is a square wave that is synchronous with a particular melody or a pattern. For example, the control signal may alternate the switch 48 between the open state and the closed state in sync with the song Jingle Bells.

The power storage 52 is electrically coupled between the node 56 and the node 58. The power storage 52 provides filtration and power storage. As previously discussed, as best shown in FIG. 2, the LED string lights 10 are a plurality of diodes that are arranged in series in a single direction, and the LED string lights 10 can be considered to be a unidirectional conducting circuit or a half-wave rectifier. The LED string lights 10 will utilize the AC signal generated by the AC power source 22 when the AC signal is positive, and will block the AC signal when the AC signal is negative. Consequently, the LED flasher bulb 18, specifically the controller 50, will no longer receive the input voltage $V_{IN}$, when the AC signal is negative. Accordingly, the controller 50 needs another source of power to continue to control the switch 48 when the AC signal is negative.

The power storage 52 aids the voltage regulator 46 to generate a steady power signal for the controller 50 by storing the steady power signal generated by the voltage regulator 46 for later use. Namely, the power storage 52 acts as a buffer battery to compensate for the loss of power when the AC signal is negative. The power storage 52 stores the steady power signal generated by the voltage regulator 46 when the AC signal is positive, and provides the steady power signal to the controller 50 when the AC signal is negative. As a result, the LED flasher bulb 18 is able to continuously function and provide the flashing function regardless of whether the AC signal (i.e., $V_{IN}$) generated by the AC power source 22 is positive or negative. The controller 50 is able to continue to control the switch 48 to be in the open or closed state when the AC power source 22 is providing power to the LED flasher bulb 18 (i.e., the AC signal is positive) or when the AC power source 22 is not providing power to the LED flasher bulb 18 (i.e., the AC signal is negative).

As the LED flasher bulb 18 is able to continuously function regardless of whether the AC signal generated by the AC power source 22 is positive or negative, the controller 50 is able to alternate the switch 48 between the open state and the closed state at a frequency that is independent of the frequency of the AC power source 22. In one embodiment, the controller 50 alternates the switch 48 between the open state and the closed state at a first frequency, and the AC power source 22 alternates between a positive voltage level or value and a negative voltage level or value at a second frequency that is different from the first frequency.

The power storage 52 may be any type of power storage now known or later developed. In one embodiment, as shown in FIG. 6, the power storage 52 is a capacitor. In one embodiment, the capacitor has a rating between 1 and 5 volts, for example.

When in operation, the LED flasher bulb 18 receives the input voltage $V_{IN}$ at the input terminal 30. The LED 24 receives the input voltage $V_{IN}$ and will light up depending on whether the switch 48 is in the open state or the closed state. In the open state, the switch 48 creates an open circuit in the LED string lights 10 and the LED string lights 10 will not light up. In the closed state, the switch 48 closes the circuit (i.e., grounds the LED 24) in the LED string lights 10 and the LED string lights 10 will light up. The controller 50 generates a control signal that alternates the switch 48 between being in the open state and the closed state according to a determined pattern. The controller 50 receives power from the voltage regulator 46 or the power storage 52. When the AC signal generated by the AC power source 22 (i.e., $V_{IN}$) is positive, the voltage regulator 46 receives the input voltage $V_{IN}$ and generates a steady power signal for the controller 50. When the AC signal (i.e., $V_{IN}$) is negative, the controller 50 receives a power signal from the power storage 52. The power storage 52 stores power by storing the steady power signal generated by the voltage regulator 46 when the AC signal is positive.

In accordance with one or more embodiments, the LED flasher bulb 18 is a single package having a form factor similar or identical to a traditional LED or incandescent light bulb for string lights. The LED flasher bulb 18 provides a flashing function for the LED string lights 10 without the use of an external device, such as an external control circuit board, that is separate from the string lights 10. The LED flasher bulb 18 is easily installed by inserting the LED flasher bulb 18 into any of the connectors 12 of the LED string lights 10. For example, a user may replace a conventional LED 14 with the LED flasher bulb 18 to convert an LED string lights from "steady on" operation to "flashing" operation. For LED string lights that include multiple parallel strings, the user may replace a conventional LED 14 in each of the parallel strings with an LED flasher bulb 18. The LED flasher bulb 18 includes high-voltage electrical components that are able to function directly with the AC power source 22, which may reach up to 300 volts. The LED flasher bulb 18 alternates the LED string lights 10 between an on state in which the LEDs 14 and the LED flasher bulb 18 are lit up, and an off state in which the LEDs 14 and the LED flasher bulb 18 are not lit up. As the LED flasher bulb 18 includes the voltage regulator 46 and the power storage 52, the LED flasher bulb 18 is able to continuously alternate the LED string lights 10 between the on state and the off state independent of whether the AC signal generated by the AC power source 22 is positive or negative. That is, the controller 50 is able to continue to control the switch 48 to be in the open or closed state when the AC power source 22 is providing power to the LED flasher bulb 18 (i.e., the AC signal is positive), or when the AC power source 22 is not providing power to the LED flasher bulb 18 (i.e., the AC signal is negative).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
 a body having a socket;
 a first terminal on an outer surface of the body, the first terminal, in operation, receives a first signal that alternates between a positive voltage value and a negative voltage value;
 a second terminal on the outer surface of the body;
 a light emitting diode (LED) inserted into the socket and electrically coupled to the first terminal; and
 an integrated circuit embedded within the body, the integrated circuit including:
  a voltage regulator electrically coupled to the first terminal, the voltage regulator, in operation, generates a second signal using the first signal, the second signal having a steady voltage level when the first signal has the positive voltage value;
  a switch electrically coupled to the LED and the second terminal, the switch having an open state and a closed state, the LED being electrically decoupled from the second terminal when the switch is in the open state, the LED being electrically coupled to the second terminal when the switch is in the closed state;
  a controller electrically coupled to the switch and the voltage regulator, the controller, in operation, generates a control signal that alternates the switch between the open state and the closed state; and a power storage electrically coupled to the voltage regulator, the controller, and the second terminal, the power storage, in operation, maintains the second signal when the first signal has the negative voltage value.

2. The device of claim 1 wherein the switch is a high voltage metal oxide semiconductor field effect transistor (MOSFET) capable of withstanding at least 300 volts.

3. The device of claim 1 wherein the voltage regulator is a low drop output voltage-regulator tube.

4. The device of claim 1 wherein the switch is a transistor.

5. The device of claim 4 wherein the controller is electrically coupled to a gate of the transistor, and the control signal is a square wave.

6. The device of claim 1 wherein the power storage is a capacitor.

7. The device of claim 1 wherein the first signal alternates between the positive voltage value and the negative voltage value according to a first frequency, and the control signal alternates the switch between the open state and the closed state according to a second frequency that is different from the first frequency.

8. A system, comprising:
a first light emitting diode (LED) having an anode and a cathode;
a second light emitting diode (LED) having an anode and a cathode; and
a device, including:
a first terminal electrically coupled to the cathode of the first LED;
a second terminal electrically coupled to the anode of the second LED;
a third light emitting diode (LED) having an anode and a cathode, the anode of the third LED electrically coupled to the first terminal;
a voltage regulator electrically coupled to the first terminal;
a switch electrically coupled to the cathode of the third LED and the second terminal, the switch having an open state and a closed state, the third LED being electrically decoupled from the second terminal when the switch is in the open state, the third LED being electrically coupled to the second terminal when the switch is in the closed state;
a controller electrically coupled to the voltage regulator and the switch, the controller, in operation, generates a control signal to alternate the switch between the open state and the closed state according to a pattern; and a power storage electrically coupled to the voltage regulator, the controller, and the second terminal.

9. The system of claim 8 wherein the first terminal, in operation, receives a first signal that alternates between a positive voltage value and a negative voltage value.

10. The system of claim 9 wherein the controller, in operation, receives a second signal from the voltage regulator in response to the first signal having the positive voltage value.

11. The system of claim 8 wherein the switch is a transistor and the power storage is a capacitor.

12. A device, comprising:
a body having a socket for a light emitting diode, a base, and a stud extending from the base;
a first terminal on an outer surface of the stud, the first terminal, in operation, receives a first signal that alternates between a positive voltage value and a negative voltage value;
a second terminal on the outer surface of the stud;
an integrated circuit embedded within the base, the integrated circuit including:
a voltage regulator electrically coupled to the first terminal;
a switch electrically coupled to the socket and the second terminal, the switch having an open state and a closed state, the socket being electrically decoupled from the second terminal in the open state, the socket being electrically coupled to the second terminal in the closed state;
a controller electrically coupled to the switch and the voltage regulator, the controller, in operation, generates a control signal that alternates the switch between the open state and the closed state; and
a power storage electrically coupled to the voltage regulator, the controller, and the second terminal.

13. The device of claim 12 wherein the voltage regulator, in operation, generates a second signal using the first signal, and the second signal has a steady voltage level when the first signal has the positive voltage value.

14. The device of claim 13 wherein the power storage, in operation, stores the second signal from the voltage regulator when the first signal has the negative voltage value.

15. The device of claim 12 wherein the socket is spaced from the stud by the base.

16. The device of claim 12 wherein the stud includes a plurality of ribs.

17. The device of claim 12 wherein the base includes a guide that protrudes from a surface of the base.

18. The device of claim 12 wherein the switch is a transistor and the power storage is a capacitor.

* * * * *